(12) United States Patent
Khojastepour

(10) Patent No.: US 8,284,859 B2
(45) Date of Patent: *Oct. 9, 2012

(54) QUANTIZED FEEDBACK STRATEGIES AND SIGNAL GENERATION

(75) Inventor: Mohammad A. Khojastepour, North Brunswick, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,750

(22) Filed: May 20, 2011

(65) Prior Publication Data

US 2011/0268221 A1  Nov. 3, 2011

Related U.S. Application Data

(62) Division of application No. 12/951,855, filed on Nov. 22, 2010, which is a division of application No. 11/693,286, filed on Mar. 29, 2007, now Pat. No. 7,839,835.

(60) Provisional application No. 60/823,144, filed on Aug. 22, 2006.

(51) Int. Cl.
*H04L 27/00* (2006.01)

(52) U.S. Cl. ........................................ 375/295; 370/343

(58) Field of Classification Search .................. 370/329, 370/343; 375/260, 295, 296
See application file for complete search history.

(56) References Cited

U.S. PATENT DOCUMENTS

| | | | | |
|---|---|---|---|---|
| 2011/0194646 A1* | 8/2011 | Khojastepour | ............... | 375/295 |
| 2011/0194647 A1* | 8/2011 | Khojastepour | ............... | 375/295 |
| 2011/0268066 A1* | 11/2011 | Khojastepour | ............... | 370/329 |
| 2011/0268205 A1* | 11/2011 | Khojastepour | ............... | 375/260 |
| 2011/0268219 A1* | 11/2011 | Khojastepour | ............... | 375/295 |
| 2011/0268220 A1* | 11/2011 | Khojastepour | ............... | 375/295 |
| 2011/0268222 A1* | 11/2011 | Khojastepour | ............... | 375/295 |
| 2011/0268223 A1* | 11/2011 | Khojastepour | ............... | 375/295 |
| 2011/0274189 A1* | 11/2011 | Khojastepour | ............... | 375/260 |
| 2011/0274190 A1* | 11/2011 | Khojastepour | ............... | 375/260 |
| 2011/0274209 A1* | 11/2011 | Khojastepour | ............... | 375/296 |
| 2012/0063538 A1* | 3/2012 | Khojastepour | ............... | 375/295 |

* cited by examiner

*Primary Examiner* — Leon-Viet Nguyen

(74) *Attorney, Agent, or Firm* — Akitaka Kimura; Joseph Kolodka

(57) ABSTRACT

Methods and apparatus are disclosed for applying successive multi-rank beamforming strategies (e.g., successive precoding strategies) for the design of precoders over a set of parallel channels. Successive beamforming is applied to a narrow band channel model and is also applied for finer quantization of a single beamforming vector (e.g., recursive beamforming). A first embodiment provides the optimal approach with high complexity. An alternative embodiment provides successive beamforming for near optimal precoding selection with medium complexity. A low complexity method for precoder selection is also provided wherein a channel representative matrix for the set of parallel channels is determined and successive beamforming on the calculated channel representative is applied.

7 Claims, 6 Drawing Sheets

US 8,284,859 B2

QUANTIZED FEEDBACK STRATEGIES AND SIGNAL GENERATION

This application is a divisional of co-pending U.S. patent application Ser. No. 12/951,855, filed Nov. 22, 2010, which in turn is a divisional of U.S. patent application Ser. No. 11/693,286, filed Mar. 29, 2007, which in turn claims priority to U.S. Provisional Patent Application No. 60/823,144, filed Aug. 22, 2006, which is incorporated by reference herein.

FIELD OF THE INVENTION

The present invention relates generally to data transmission, and more particularly to quantized precoding over a set of parallel channels.

BACKGROUND OF THE INVENTION

Prior art downlink orthogonal frequency-division multiplexing multiple input multiple output (DL OFDM MIMO) transmission strategies includes quantized precoding schemes, antenna selection, antenna cycling (with or without rank control), and different space-time coding and spatial multiplexing transmission scheme.

Precoding and beamforming also have been considered in prior art where, generally, beamforming corresponds to one stream transmission (rank one) and precoding corresponds to multiple stream transmission (rank two and higher). The prior methods are complex and do not provide sufficient throughput.

Accordingly, a new method of applying successive multi-rank beamforming strategy (e.g., successive precoding strategy) for the design of precoders over a set of parallel channels is desired.

SUMMARY OF THE INVENTION

The present invention provides improved methods for applying successive multi-rank beamforming strategies (e.g., successive precoding strategies) for the design of precoders over a set of parallel channels. Similarly, successive beamforming is applied to a narrow band channel model and is also applied for finer quantization of a single beamforming vector (e.g., recursive beamforming).

Multiple approaches for precoder selection over set of parallel channels are described herein. A first method provides the optimal approach with very high complexity. An alternative method provides successive beamforming for near optimal precoding selection with medium complexity is also provided. In another embodiment, a low complexity method for precoder selection is provided wherein a channel representative matrix for the set of parallel channels is determined and successive beamforming on the calculated channel representative is applied.

The present methods show considerable performance improvement in comparison to the prior precoding strategies. Moreover, the performance loss due to the suboptimal precoding selection is negligible, while the reduction in computation complexity is significant.

Additionally, one aspect of the present invention provides a feedback reduction technique. In this technique, after choosing the precoder with a pre-defined rank (e.g., k), a single codeword (SCW) is sent by encoding over all k streams. Alternatively, multiple codewords (MCW) are sent by encoding each codeword over one or more streams. In SCW, it is only necessary to report one channel quality index (CQI), while in MCW several CQI must be fed back. To reduce CQI feedback, a pseudo-random scrambler is employed to encode multiple codewords over multiple streams. With this technique the CQI feedback requirement is substantially reduced.

For example, when a receiver uses a LMMSE demodulator, it is only necessary to report a single CQI that is good for all the channels. This "pseudo-random scrambling" has negligible effect in terms of capacity loss, while increasing the decoder throughput requirement of the system.

In some embodiments a structured codebook is used to perform successive beamforming. This structured codebook uses the feedback bits more efficiently and needs less memory for storage.

These and other advantages of the invention will be apparent to those of ordinary skill in the art by reference to the following detailed description and the accompanying drawings.

DETAILED DESCRIPTION

The present invention generally provides methods and apparatus for quantized precoding over sets of parallel channels in data transmission. The methods and apparatus are applicable to (but not limited to) Downlink (DL) OFDM (orthogonal frequency-division multiplexing) MIMO (multiple input multiple output) systems. More specifically, the present invention provides methods for precoder selection over a set of parallel MIMO channels. A method for determining an optimal precoder is provided. Additionally, other, less computationally complex, methods are provided. The present invention additionally provides a method of reducing feedback in data transmission over parallel channels.

Figure 1:
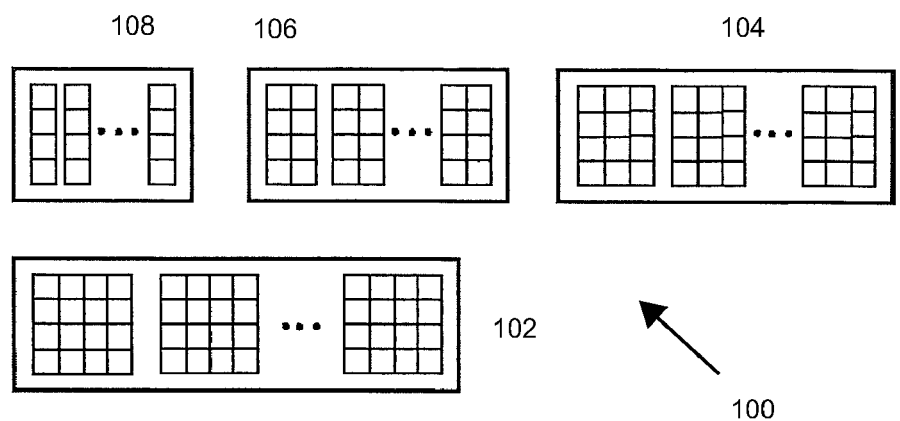
FIG. 1 depicts a rank specific codebook in a MIMO system.
Figure 2:
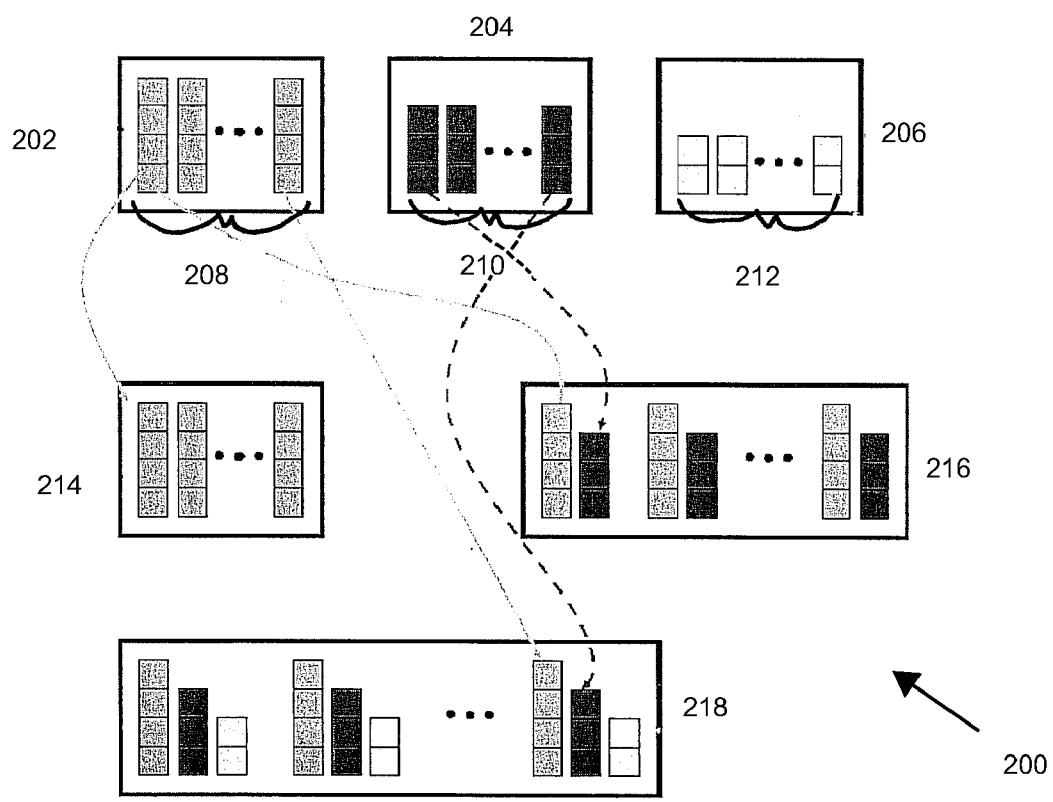
FIG. 2 depicts an exemplary rank specific codebook.

FIG. 1 represents a rank specific codebook for four transmission antennas at a node B (e.g., a base transceiver station, a receiver and/or transmitter, an antenna, etc.) in a MIMO system. FIG. 2 represents a rank specific codebook derived from a three vector codebook or two, three, and four dimensional vectors.

In an exemplary case of a transmission system with four transmission antennas at a node B, FIG. 1 depicts potential codebooks 102, 104, 106, 108. Codebook 102 is a 4×4 matrix (e.g., rank ), codebook 104 is a 4×3 matrix (e.g., rank ), codebook 106 is a 4×2 matrix, (e.g., rank), and codebook 108 is a 4×1 matrix (e.g., rank one).

By using successive beamforming, all the codebooks may be derived from three vector codebooks 202 ($C_4$), 204 ($C_3$), and 206 ($C_2$) consisting of $2^{B_4}$ (4×1)-dimensional vectors 208, $2^{B_3}$ (3×1)-dimensional vectors 210, and $2^{B_2}$ (2×1)-dimensional vectors 212, respectively, as shown in FIG. 2. Each vector codebook 202-206 may be optimally designed by maximizing the minimum distance (e.g., chordal distance, Fubini-Study distance, p-norm distance, etc.) between each pair of the vectors 208-212 in the codebooks 202-206.

For rank one transmission the vectors 208 and 212 from the codebooks 202 and 206 may be used directly, and the feedback index (FBI) requirement is $B_4$ and $B_2$ bits plus bits required to specify the rank, respectively. A 2×2 codebook 214 may be constructed by adding an orthonormal vector to each of the vectors in the codebook 206 to construct $2^B{}_2$ matrices of size 2×2. For rank two transmission from a Node B with four antennas, the 4×3 codebook 216 may be constructed by considering the Cartesian product $C_4 \times C_3$. Therefore, the FBI feedback requirement is $B_4+B_3+\text{rank}$ bits. For rank three transmission, only a subset $C''_2$ of size $2^{B'}{}_2$ from the codebook 206 may be considered and the 4×3 codebook 218 is constructed as the Cartesian product $C_4 \times C_3 \times C'_2$ and the FBI feedback requirement is $B_4+B_3+B'_2+\text{rank}$ bits. By adding the fourth orthonormal vector to each matrix in 4×3 codebook 218, a rank four codebook may be obtained.

While the bits for the FBI feedback for both rank one and rank two transmission from a Node B equipped with two antennas are the same, the above derivation of the codebook for a base transceiver station with four antennas presents a variable feedback for different ranks (e.g., $B_4+\text{rank} < B_4+B_3+\text{rank} < B_4+B_3+B'_2+\text{rank}=B_{max}$). Accordingly, if the FBI feedback bits for all the cases are equal, the above construction would incur a loss from the possible optimal rank specific codebook design. One solution, for example, is to construct larger codebook $C''_4$ of size $2^{Bmax}$ with $C_4$ as an embedded codebook.

To avoid the extra memory requirement for keeping such large codebook, a method of recursive beamforming may be utilized, as described below. The recursive beamforming may use the same vectors from $C_4$, $C_3$, and $C''_2$ to construct a $2^{B4+B3+B'2}$ sized vector codebook of (4×1)-dimensional vectors. Such an extension of $C_4$ to a larger codebook does not require extra memory, while in practice the performance degradation with respect to the optimal design is negligible.

In an exemplary embodiment, such codebooks consist of m sets of vectors in $V^{(1)}=\{v_i^{(1)}\}_{i=1}^{N_1} \subset C^m, V^{(2)}=\{v_i^{(2)}\}_{i=1}^{N_2} \subset C^{m-1}, \ldots, V^{(m)}=\{v_i^{(m)}\}_{i=1}^{N_m} \subset C^{m-2}$. Without loss of generality, the first element of each vector is assumed to be real valued, or each vector is multiplied by a complex exponential to remove the phase of the first element of the vector. This property is used later to define a convenient rotation transformation based on the householder transformation. In order to define the proper complex householder transformation the first element of the vector has to be real valued.

The following precoding matrices can be generated based on vector codebooks. For $i_k=1, 2, \ldots, N_k$, $k=1, 2, \ldots, m$:

$$A(v_{i_1}^{(1)}, v_{i_2}^{(2)}, v_{i_3}^{(3)}, \ldots) = [v_{i_1}^{(1)}, HH(v_{i_1}^{(1)} - e_1^m)[0;\\ v_{i_2}^{(2)}], HH(v_{i_1}^{(1)} - e_1^m)[0; HH(v_{i_2}^{(2)} - e_1^{-1m})[0;\\ v_{i_3}^{(3)}]] \ldots ][v_{i_1}^{(1)}, HH(v_{i_1}^{(1)} - e_1^m)[0; v_{i_2}^{(2)},\\ HH(v_{i_2}^{(2)} - e_1^{m-1})[0; v_{i_3}^{(3)}, \ldots ]]]$$

where $$e_1^k = \left[1; \underbrace{0; \ldots; 0}_{k-1}\right]$$

and $HH(v_{i_k}^{(k)} - e_k^m)$ is any rotation matrix that transforms the vector $v_{i_k}^{(k)}$ to the unit vector $e_k^m$. An example of such transformation is a householder transformation defined by $$HH(x) = I - \frac{2xx^*}{\|x\|^2}$$

corresponding to the complex vector x.

By using the above m×m constructed matrices $A(v_{i_1}^{(1)}, v_{i_2}^{(2)}, \ldots)$ the rank n precoding matrix is formed by picking n columns out of the possible m columns. The matrix codebook is not stored at the user equipment (UE). Instead, the vector codebook $V^{(1)}, V^{(2)}, \ldots, V^{(m-1)}$ is stored. Depending on the beamforming strategy either the set of rotations $\{HH(v_{i_k}^{(k)} - e_k^m), 1 \leq i_k \leq N_k, 1 \leq k \leq m\}$ for SVD based precoding selection, or all the required $$2 \frac{\alpha_{i_p,i_{p+1},\ldots,i_q}^{p,q}}{a_{i_p}^{(p)}}\text{'s}$$

for CQI-metric based precoder selection are stored. In such arrangements, $a_{i_p}^{(p)}=2(1-v_{i_p}^{(p)}(1))=\|v_{i_p}^{(p)}-e_1^{m-p+1}\|^2$ and $v_{i_p}^{(p)}(1)$ is the first element of vector $v_{i_p}^{(p)}$. Also, $\alpha_{i_p,i_{p+1},\ldots,i_q}^{p,q}=\alpha(v_{i_p}^{(p)}, v_{i_{p+1}}^{(p+1)}, \ldots, v_{i_q}^{q})$ such that:

$$\alpha_{i_p,i_{p+1},\ldots,i_q}^{p,q}=v_{i_p}^{(p)*}[0; HH(v_{i_{p+1}}^{(p+1)}-e_1^{m-p})\\ [0; HH(v_{i_{p+2}}^{(p+2)}-e_1^{m-p-1})]][\ldots HH(v_{i_{q-1}}^{(q-1)}-\\ e_1^{m-q+2})[0; v_{i_q}^{(q)}] \ldots ]]$$

For the case that the maximum rank is k, the memory requirement may be reduced by storing, for example, only $V^{(1)}, V^{(2)}, \ldots, V^{(k)}$, and the associated values of $$2 \frac{\alpha_{i_p,i_{p+1},\ldots,i_q}^{p,q}}{a_{i_p}^{(p)}}\text{'s.}$$

Figure 3:
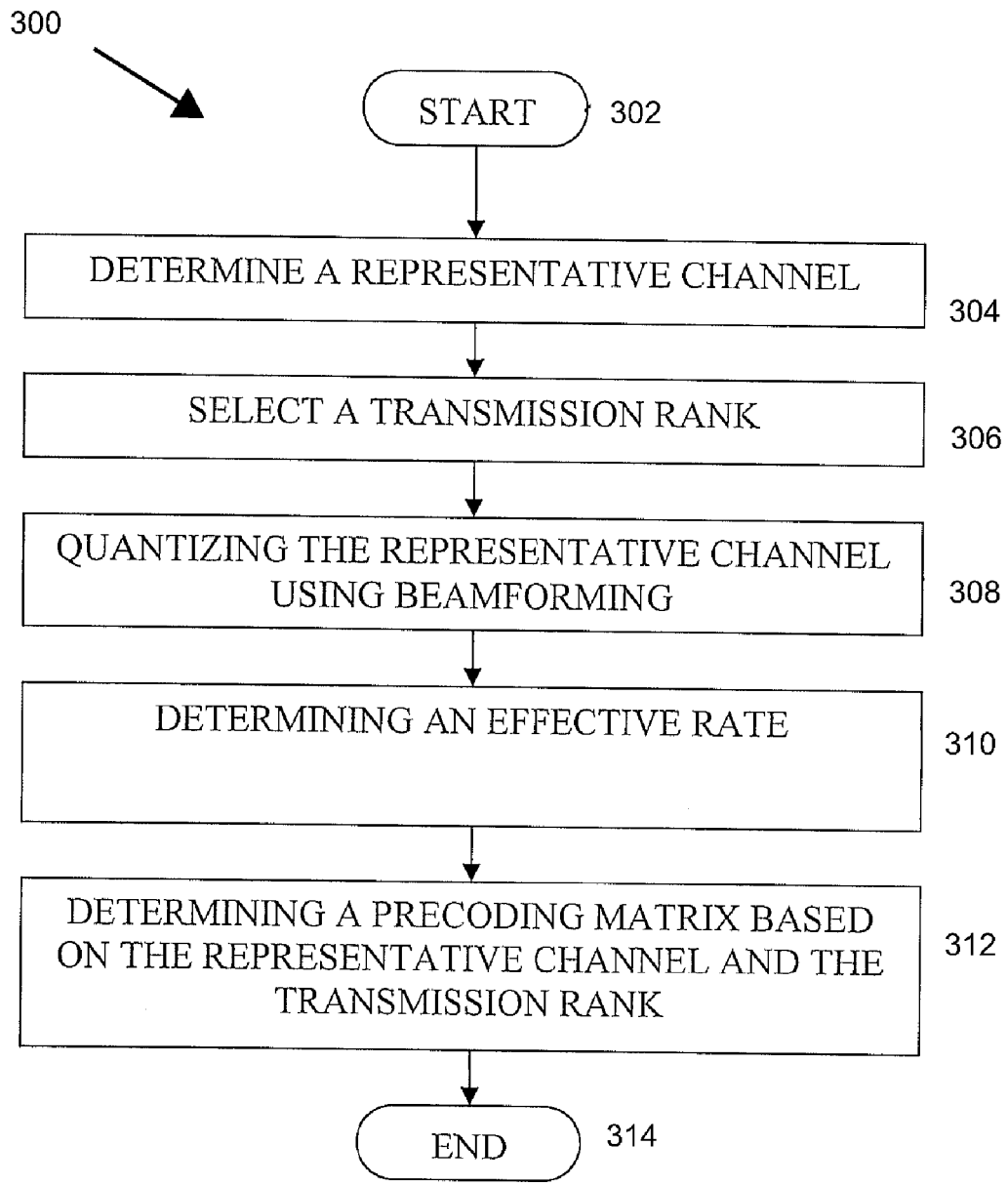
FIG. 3 depicts a method for precoding over a set of parallel channels according to some embodiments of the present invention.

FIG. 3 depicts a method 300 for precoder selection over a set of parallel channels. The method begins at step 302.

In step 304, a representative channel is determined. The optimal precoding index may be found through wide-band precoding over the set of OFDM tones in each sub-band, (e.g., multiple adjacent chunks over which the FBI feedback is reported). To avoid the computational complexity of finding the optimal wide-band precoder over large cluster sizes (e.g., where $T_2-T_1=75$ OFDM tones=3 chunks), the signal to noise plus interference ratios (SINRs) for all the entries of the codebook may be determined. This may be accomplished by computing a representative channel (e.g., $H_{rep}$) for the whole sub-band from $T_1$ to $T_2$ (e.g., two tones) as follows:

$$H_{rep} = \left\{\sum_{i=T_1}^{T_2} H_i^* H_i\right\}^{1/2}$$

where $\{.\}^{1/2}$ denotes the matrix square root operation and $H_i$ is the estimate of the channel for the $i^{th}$ OFDM tone. Other appropriate methods of determining a representative channel may be used.

In step 306, a transmission rank is selected. The transmission rank may be selected based on a modified capacity measure.

In step 308, the representative channel is quantized using beamforming. In one embodiment of the invention the representative channel is quantized using successive beamforming. In another embodiment, recursive beamforming is used.

By using successive beamforming, the first N=r dominant right eigenmodes of $H_{Rep}$ may be quantized using singular value decomposition (SVD).

In an exemplary embodiment, let $H_i$ for $i=T_1, T_1+1, \ldots T_2$ represent the set of parallel channels over which to find the optimal precoder of a specified rank. Each $H_i$ may be an N×M matrix in which M transmitters (e.g., transmit antennas) and N receivers (e.g., reception antennas) are used. In general, such parallel channels might not be correlated and a precoder which is good for one channel might not be a good precoder for the other channels. However, in MIMO OFDM systems, if the size of the chunk (e.g., the set of parallel channels from $T_1$ to $T_2$) is chosen appropriately, the channels are usually correlated and a unique precoder is substantially optimal for all the tones.

Further discussion of quantizing is discussed below with respect to the methods 400 and 500.

In step 310, an effective rate is determined. In determining the effective rate in a multi-rank beamforming scheme (MRBF), Linear Minimum Mean Squared Error (LMMSE) demodulators at the receiver end are advantageous. However, the precoding selection scheme described herein may also be extended to the cases where other demodulators (e.g., decoders) such as a Minimum Mean Square Error, Successive Interference Cancellation (MMSE-SIC), ML Detector based on QR decomposition (QR-MLD), Maximum Likelihood (ML) and/or any other appropriate demodulators are used.

The number of transmission streams may be defined as transmission rank and may be controlled as a function of the channel state and Signal to Noise Ratio (SNR) (e.g., the equivalently available transmit power) in order to maximize the system throughput. The effective rate of MRBF using ML and MMSE-SIC decoding is given by:

$$C_{MRBF} = \sum_{i=T1}^{T2} \log(\det(I + \rho H_i QQ^* H_i^*))$$

where:

M is a number of transmitters, N is a number of receivers, Q is an M×k determined precoding matrix (e.g., precoder) for a rank k transmission, $H_i$ is an N×M estimated channel matrix, $T_1$ to $T_2$ are adjacent tones, $\rho=P/N_o$, $N_o$ is the noise variance, and P is a power at the transmitters M.

The effective rate of MRBF using LMMSE (or generally, any decoder) decoding is given by:

$$C_{MRBF} = \sum_{i=T_1}^{T_2} \sum_{p=1}^{k} \log(1 + {}^{(i)}SINR_p)$$

where $^{(i)}SINR_p$ is the signal-to-interference plus noise ratio of the $p^{th}$ stream of the $i^{th}$ user. Such an effective SINR (in an exemplary rank 2 case) may be expressed as:

$${}^{(c)}SINR_p = \frac{\rho}{\left(\frac{I}{\rho} + {}^{(c)}W^{(ij)}\right)^{-1}_{1,1}} \left(1 + \rho \left\| \tilde{H}_c v_j^{(2)} - \frac{2\alpha_{ij}}{a_i}(H_c v_i^{(1)} - h_1^{(c)}) \right\|^2 \right).$$

If $V_1, V_2, \ldots$ represents the column of Q, the corresponding rate for a rank one transmission is given by:

$$C = \sum_{i=T1}^{T2} \log(\det(I + PH_i V_1 V_1^* H_i^*))$$

$$= \sum_{i=T1}^{T2} \log(\det(1 + PV_1^* H_i^* H_i V_1)).$$

For a rank two transmission, the rate is given by:

$$C = \sum_{i=T1}^{T2} \left[ \begin{array}{l} \log(1 + (P/2)V_1^* H_i^*(I + (P/2)H_i V_2 V_2^* H_i^*)^{-1} H_i V_1) + \\ \log(1 + P/2)V_2^* H_i^*(I + (P/2)H_i V_1 V_1^* H_i^*)^{-1} H_i V_2 \end{array} \right]$$

A similar expansion may be performed based on the chain rule for any rank k. One of ordinary skill in the art will recognize that similar computations may be performed.

In step 312, a precoding matrix is determined based on the representative channel and the transmission rank. For a quantized feedback scheme, the sets of precoders of rank one to rank k of size $N_1, N_2, \ldots, N_k$ are pre-designed such that $\log_2(N_1+N_2, +\ldots, +N_k)$ is equivalent to the number of available feedback bits and the index of the selected precoder is fed back depending on the channel condition and available power. To select the optimal precoder index, it is necessary to search for the best precoder over the precoding codebook set.

In one aspect of the invention, a channel quality index (CQI) is determined. Assuming ML, LMMSE, or MMSE-SIC decoding the corresponding effective rate expression for each precoding matrix in the codebook of different ranks is determined as described above. The CQIs for each rank are evaluated in ascending order. The CQI is determined when the maximum CQI achieved with the new rank is not increasing with respect to the prior rank. Using the determined CQI, the precoder is calculated.

Due to the nested structure of the codebook, the SINR computations and the precoder selection can be considerably simplified by avoiding redundant computations. For a rank i, $1 \leq i \leq k$, the effective rate may be calculated for each precoding matrix in the codebook of rank i. For i=1, such search is not exhaustive. However, increasing the precoder rank and increasing the number of precoders in the codebooks of higher ranks makes the search more complex.

In another aspect, the precoding matrix may be determined by performing SVD on the representative channel. SVD of an estimated channel (e.g., the actual channel and/or channel estimate) $H_k$ may be equivalent to the representative channel $H_{Rep}$ for the $k^{th}$ user channel in the sub-band from $T_1$ to $T_2$. The estimated channel may be represented as $H_k=U_k D_k V^*_k$ where the columns of the unitary matrix $V_k=[v_1\ v_2 \ldots v_{Nk}]$ represent different eigen-vectors of the channel. For a given rank N, quantized beamforming may find the best quantization of the first N dominant eigen-vectors of the channel. If $B_i$ bits are used for the quantization of $i^{th}$ eigen-vector $v_i$, the quantized vector $\hat{v}_1$ is given by:

$\hat{v}_1 = arg\ max|v^*_i\ w|$ wherein $w \in C_i = \{w_i;\ w_2;\ \ldots;\ w_{2Bi}\}$ and where $C_i$ is the corresponding quantization codebook.

Successive beamforming may be performed by selecting the precoders of rank i column-by-column, significantly reducing the complexity. In successive beamforming, the first column of the precoder Q may be chosen by considering only the first term of the effective rate as expanded by the chain rule, wherein only the mutual information of the first stream is maximized. After selecting the first column of the precoding matrix, the second term is considered wherein the mutual information of the second stream is considered and maximized by treating the first stream as noise. This process may be performed successively (e.g., iteratively).

In still another aspect, the complexity of such a precoder design for the set of parallel channels may be further reduced using channel representative based selection. If the number of such parallel channels is large, at each step between $(T_2-T_1)$ to $3(T_2-T_1)$ matrix multiplications may be performed. For example, where a normal chunk size $T_1-T_2$ is equal to 75 tones for $3^{rd}$ Generation Partnership Project: Long Time Evolution MIMO (3GPP MIMO LTE) studies with a 6 multi-path Spatial Channel Model-Extended (SCME) channel model and 512 Fast Fourier Transform (FFT) points.

In order to derive this alternative beamforming strategy with reduced complexity, a precoding bound that is valid for high SNR is considered.

$$C = \sum_{i=T1}^{T2} \log(\det(I + \rho H_i Q Q^* H_i^*))$$
$$= \rho \sum_{i=T1}^{T2} tr(H_i Q Q^* H_i^*)$$
$$= \rho \sum_{i=T1}^{T2} tr(Q^* H_i^* H_i Q)$$
$$= \rho Q \left\{ \sum_{i=T1}^{T2} tr(H_i^* H_i) \right\} Q$$

(e.g., the upper bound)

The above precoding upper bound is a bound in which only one precoder is used for the whole set of parallel channels. If the precoder is chosen separately for each tone or channel i, for all $T_1 \leq i \leq T_2$, then the bound is obtained as $$C = \sum_{i=T1}^{T2} \log(\det(I + \rho H_i Q_i Q^* H_i^*))$$

(e.g., the loose bound).

The optimal per-tone precoder $Q_i$ is obtained as the k dominant right eigenvectors of the channel $H_i$ where k is the number of nonzero singular values of $H_i$. It should be noted that either the upper bound or the loose bound may be calculated for a constant rank (e.g., rank k) or for variable rank. It is also noted that calculating the upper bound requires solving for the optimal wide-band precoder Q over set of parallel channels, an intractable problem using conventional methods. Conversely, the loose bound may be computationally expensive, but provides a tractable solution.

The above high-SNR approximation provides a good approximation of the actual bound in a practical range of SNR for most MIMO OFDM systems. The upper bound may be calculated by first finding a representative channel of the set of parallel channel as discussed above with respect to step 304. It is noted that $H_{rep}$ is only a representative channel to calculate the bound and the optimal precoding matrix, not an equivalent channel for this set of parallel channels. The bound is then calculated using the value of the precoding matrix Q.

This high-SNR approximation in finding optimal precoders for the set of parallel channels not only enables calculating such a bound, but it also significantly reduces the complexity of successive beamforming strategy described above. Using the above technique, the representative channel matrix $H_{rep}$ for the set of parallel channels is calculated. Subsequently, successive beamforming is performed on $H_{rep}$ as it is done for narrow-band systems. As a result, there would be no need to perform $N_1 \times (T_2-T_1)$ matrix multiplication in order to pick the first vector, and similarly there would be no need to perform $N_2 \times (T_2-T_1)$ matrix multiplication for picking the second column of the precoding matrix, etc. Simulation results indicate the loss in such precoding selection process based on $H_{rep}$ is usually negligible.

The method ends at step 314.

Similarly, computations for LMMSE Filter and SINR may be used. Let $H_c = [h_1^{(c)} h_2^{(c)} \ldots h_m^{(c)}]$ be the channel matrix of the $c^{th}$ channel where m is the number of transmission antennas and $H_{(p)}^{(c)} = [h_p^{(c)} h_{p+1}^{(c)} \ldots h_m^{(c)}]$. For an estimated channel $H_c$ and a precoding matrix $$\left( {}^{(c)}W_{i_1, \ldots, i_k}^{1,k} \right)$$

of rank k shown by the matrix $A(v_{i_1}^{(1)}, v_{i_2}^{(2)}, \ldots v_{i_k}^{(k)})$:

$${}^{(c)}W_{i_1, \ldots, i_k}^{1,k} = \left[ {}^{(c)}S_{i_1, \ldots, i_k}^{1,k} \right]^* \cdot {}^{(c)}S_{i_1, \ldots, i_k}^{1,k}$$

where $${}^{(c)}S_{i_1, \ldots, i_k}^{1,k} = HA\left(v_{i_1}^{(1)}, v_{i_2}^{(2)}, \ldots v_{i_k}^{(k)}\right)$$

has the following expansion:

$${}^{(c)}S_{i_1, \ldots, i_k}^{1,k} = \begin{bmatrix} Hv_{i_1}^{(1)}, H_{(2)}v_{i_2}^{(2)} - \\ 2\frac{\alpha_{i_1, i_2 1}^{1,2}}{a_{i_1}^{(1)}} \left(Hv_{i_1}^{(1)} - h_1, \ldots H_{(k)} v_{i_k}^{(k)} - \right. \\ \left. 2\sum_{j=1}^{k-1} \frac{\alpha_{i_j, \ldots, i_k}^{j,k}}{\alpha_{i_j}^{(j)}} \left(H_{(j)} v_{i_j}^{(j)} - h_j\right) \right) \end{bmatrix}$$

For the $p^{th}$ (p=1, 2, ..., k) precoded stream, the corresponding SINR for the $c^{th}$ channel obtained with a LMMSE filter is given by:

$${}^{(c)}SINR_p^{LMMSE} = \frac{\rho}{\left(\frac{I}{\rho} + {}^{(c)}W_{i_1, \ldots, i_k}^{1,k}\right)_{p,p}^{-1}} - 1$$

where $\rho = P/N_0$ is the average SNR, P is the average power per stream and $N_0$ is the noise variance. Similarly, the MMSE filter expression is given by:

$$\left(\frac{I}{\rho} + {}^{(c)}W_{i_1, \ldots, i_k}^{1,k}\right)^{-1} \left[{}^{(c)}S_{i_1, \ldots, i_k}^{1,k}\right]^*.$$

In alternative embodiments, other precoder selection methods may be employed. For example, a CQI-metric based selection method may be used for precoder selection. For a rank i, $1 \leq i \leq k$, assuming ML, LMMSE, or MMSE-SIC decoding the corresponding effective rate expression for each precoding matrix in the codebook of different ranks may be calculated. The process begins by evaluating (e.g., computing) the CQIs for the rank in ascending order. The process stops when the maximum CQI achieved with the new rank is not increasing with respect to the prior rank. That is, for example, the CQI for rank is computed followed by the CQI for rank The CQIs for ranks 1 and 2 are compared to determine if an increase in throughput is found for rank If no increase is found, the method stops. If an increase is found, the method continues (e.g., computing the CQI for rank and comparing it to the CQI for rank , etc.). Accordingly, the method continues until a first CQI is substantially equal to a second CQI (where the first and second CQIs do not necessarily correspond to the first and second ranks). The index of the rank with the highest throughput (e.g., when a first CQI is substantially equal to a second CQI) then gives the appropriate precoder. Due to the nested structure of the codebook, the SINR computations and the precoder selection can be simplified by avoiding redundant computations using this method.

Similarly, an SVD based selection scheme may be used for precoder selection. Such a method may use a successive beamforming strategy in which selecting the precoders of rank i is performed successively (e.g., column-by-column). Therefore, the complexity of the algorithm is significantly reduced. In successive beamforming, the first column of the precoder matrix Q (e.g., $V_1$) is chosen by considering only the first term of the effective rate (e.g., as described above with particular attention to step 310 of method 300). Here, only the mutual information of the first stream is maximized. After selecting the first column of the precoding matrix, the second term of the effective rate is considered for a decoder (e.g., a LMMSE or a MMSE-SIC). The second term is the achievable rate of the second stream by treating the first stream as noise. At each step, the corresponding column is chosen only based on the mutual information between the received signal of the same column and the input vector by treating the previous streams as noise without considering the effect of such local maximization in the throughput of the next streams that are yet to be decoded.

Figure 4:
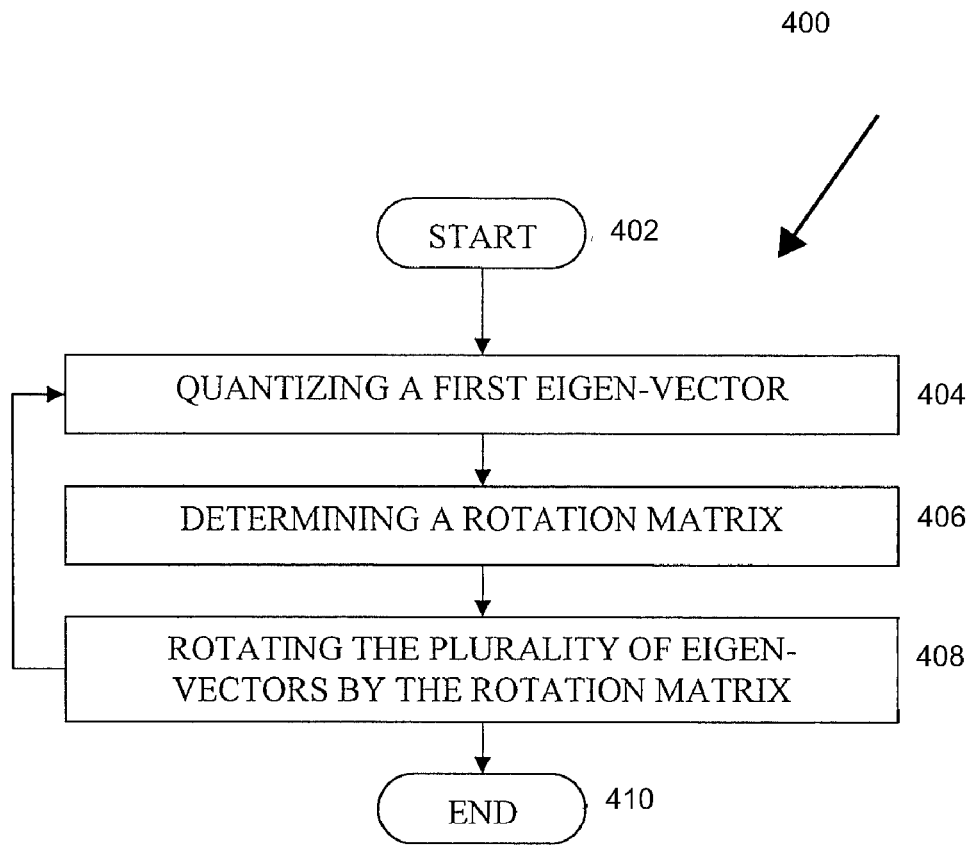
FIG. 4 depicts a method of quantizing a representative channel using successive beamforming according to some embodiments of the invention.

FIG. 4 depicts a method 400 of quantizing a representative channel using successive beamforming according to some embodiments of the invention. Such a method may be used to perform step 308 of method 300. Successive beamforming may provide a more efficient quantization of the eigen-vectors by using the fact that the column vectors $v_1$ $v_2$ ... $v_N$ are orthogonal. Therefore, the quantization of each vector may be successively performed in a lower dimensional sub-space using the knowledge of previously quantized vectors. The successive quantization may be performed as follows. The method starts at step 402.

In step 404 a first eigen-vector ($v_1$) of the representative channel is quantized. Since $v_1$ is an M dimensional vector, the quantization codebook $C^{(M)} = \{w_1; w_2; \ldots; w_{2^{B1}}\}$ comprising the M-dimensional vectors in a complex space $C^M$ (e.g., of size $2^{B1}$ using $B_1$ bits of feedback for quantization of $v_1$) may be used. The quantized vector $\hat{v}_1 \in C^{(M)}$ may be chosen to maximize $<v1; \hat{v}_1> = |v^*_1 \hat{v}_1|$. The index of $\hat{v}_1$ may then constitute the quantized feedback information for the first eigen-vector.

Then, in step 406, a rotation matrix $\Phi(\hat{v}_1)$ is determined. The rotation matrix is determined such that:

$\Phi(1) \hat{v}_1 = e_1 = [1; 0; 0; \ldots; 0]$. The rotation matrix may be a known rotation matrix or may be derived and/or determined through other appropriate means.

In step 408, the vectors $v_1$ $v_2$ ... $v_N$ (e.g., the plurality of eigen-vectors) are rotated by the rotation matrix to produce a new matrix $\tilde{V}$. Consider:

$$V' = [v'_1 \; v'_2 \ldots v'_N] = \Phi(\hat{v}_1)V = [\Phi(\hat{v}_1)v_1 \; \Phi(\hat{v}_1)v_2 \ldots \Phi(\hat{v}_1)v_N]$$

If $\hat{v}_1 = v_1$ the first vector $v'_1$ becomes $e_1$ and all the first elements of $v'_2$ $v'_3$ ... $v'_N$ are zero. This result occurs because V is a unitary matrix and all of its columns are orthogonal. Thus, if the quantization codebook is fine enough such that $\hat{v}_1$ closely approximates $v_1$, then the first element of the rotated eigen-vectors $v'_2$ $v'_3$ ... $v'_N$ may be ignored and the next eigen-vector in a lower dimensional subspace may be quantized. Accordingly, a new matrix $\tilde{V} = V'(2:M, 2:M)$ may be formed.

After step 408, the method 400 may return control to step 404 and steps 404-408 may be repeated on the new matrix $\tilde{V}$ until all of the plurality of eigen-vectors of the representative channel are quantized. The same beamforming procedure of steps 404-408 may be performed on the new matrix $\tilde{V} = V'(2:M, 2:M)$.

This step may be performed successively until all the vectors are quantized (e.g., the method steps may be performed iteratively). It should be noted that since the length of the vectors are reduced by one, the codebook used in step 404 is now one dimension lower than the codebook used in previous iteration. The above successive beamforming method 400 may generate different amounts of feedback for different ranks. Therefore, for a fixed number of feedback bits per block of transmission, different size codebooks may be generated in order to use up all available bits for different rank beamforming.

When all of the plurality of eigen-vectors of the representative channel are quantized, the method ends with step 410.

In an illustrative embodiment of the method 400, a case where the possible rank of the channels are one or two and eight bits of feedback is available is considered. One bit may be dedicated for rank selection and the other seven bits may be used for description of the eigenmodes. For rank two, four bits may be used for the first eigenmode and three bits for the second eigenmodes.

Therefore, there are $2^4 = 16$ M-vectors to quantize the first eigenmode and $2^3 = 8$ (M−1)-vector to quantize the second eigenmode. For rank one, all seven bits may be used and therefore generate $2^7 = 128$ M-vectors to be used for the quantization of the dominant eigenmode of the channel.

Figure 5:
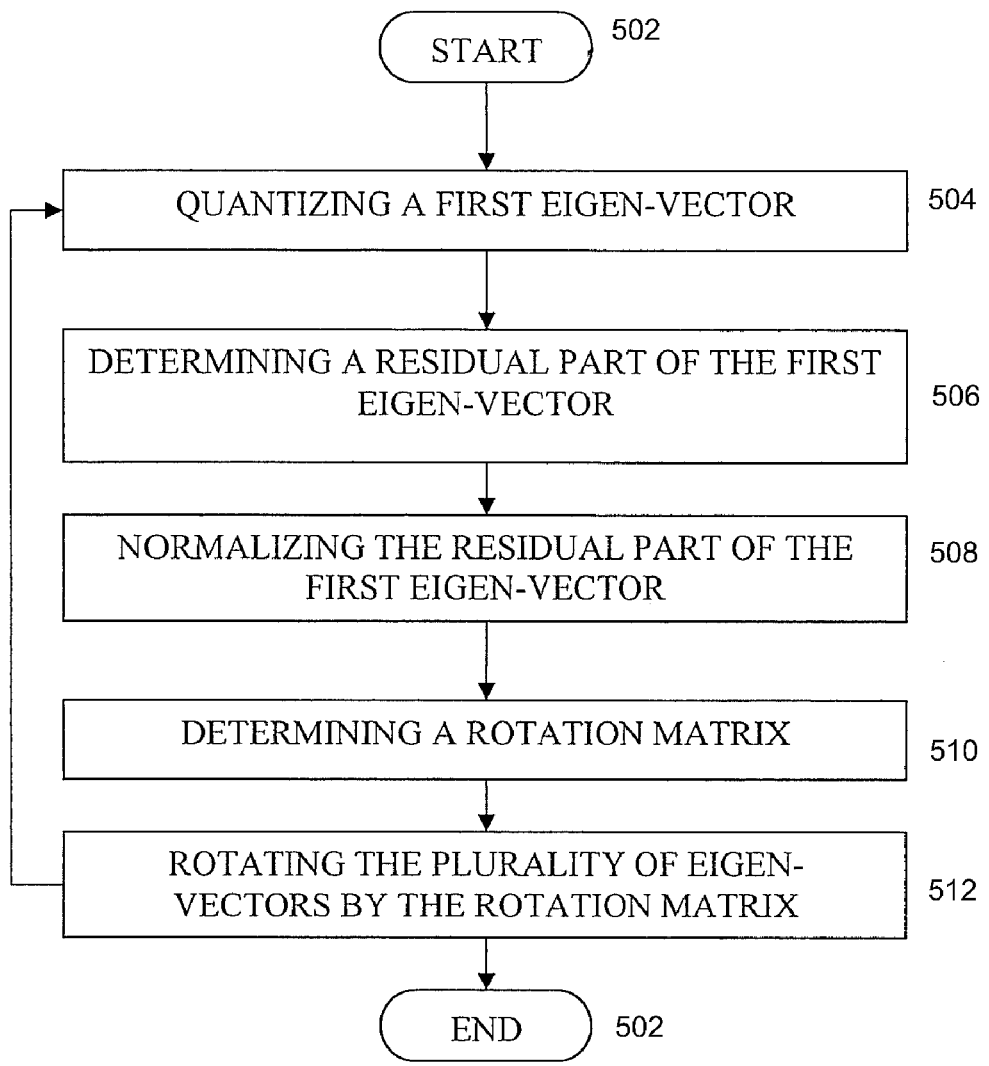
FIG. 5 depicts a method of recursive beamforming according to some embodiments of the invention.

FIG. 5 depicts a method 500 of recursive beamforming according to an embodiment of the invention. The method begins at step 502. Due to the higher computational complexity and memory requirement of successive beamforming, the alternative beamforming strategy of method 500 may be utilized in some embodiments of the present invention. Recursive beamforming may use the same idea of successive beamforming described above to quantize the vectors for the lower ranks (e.g. rank). In successive beamforming a set of orthogonal vectors (e.g., $v_1$; $v_2$; ... ; $v_k$) is quantized. Conversely, in recursive beamforming, this set is recursively generated for only one vector $v_1$.

In step 504, a first vector of the representative channel is quantized. Since $v_1$ is an M dimensional vector, it is quantized using the codebook $C^{(M)}$ of the M-vectors in $C^M$. The quantized vector $\hat{v}_1 \in C^{(M)}$ may be chosen to maximize $<v1; \hat{v}_1> = |v^*_1 \hat{v}_1|$.

In step 506, a residual part of the first vector is determined. After quantizing $v_1$ to $\hat{v}_1$ in the step 504, $v_2$ is defined as the residual of $v_1$ on the orthogonal space span$\{\hat{v}_1 \perp\}$. Accordingly, $v'_2 = v_1 - (v^*_1 \hat{v}_1) \hat{v}_1$.

In step 508, vector $v_2$ is normalized such that $$v_2 = \frac{v_2'}{|v_2'|}.$$

In step 510, a rotation matrix $\Phi(\hat{v}_1)$ is determined. The rotation matrix is determined such that $\Phi(\hat{v}_1)$ such that $\Phi(1)$ $\hat{v}_1 = e_1 = [1; 0; 0; \ldots; 0]$.

In step 512, the residual part of the first vector is rotated to produce a new matrix. The vector $v_2$ is rotated by the rotation matrix $\Phi(\hat{v}_1)$ such that $v''_2 = \Phi(\hat{v}_1) v_2$ wherein the first elements of $v''_2$ are zero because $v_2 \in \text{span}\{\hat{v}_1 \perp\}$ (e.g., $<v_2$; $\hat{v}_1> = 0$). The rotation may produce a new vector $\tilde{v}_2 = v''_2(2:M)$.

After step 512, the method 500 may return control to step 504 and the same beamforming method (e.g., steps 504-512) may be performed on the new vector $\tilde{v}_2$. The method 500 may be performed successively on each newly produced vector until all the codebooks of M-vectors, (M−1)-vectors, up to (M−k+1)-vectors are used.

Another difference between the successive beamforming strategy of method 400 on the set of orthogonal vectors $v_1$; $v_2; \ldots; v_k$ (e.g., successive beamforming) and the method 500 (e.g., recursive beamforming) of $v_1$ and its residuals $v_2$; $v_3; \ldots; v_k$ is that it is necessary to quantize the ratio of the projection of $v_1$ in each successive space for the reconstruction in recursive beamforming.

For example, for k=2 it is necessary to quantize the value $\alpha = v^*_1 \hat{v}_1$. Since recursive beamforming is used when the rank k chosen by user equipment (UE) (e.g., a controller, transmitter, receiver, or the like) is lower than the maximum possible rank $N_{max}$, the reserved feedback bits for quantization of other eigenmodes can be used for quantizing the projection values. As a result, the recursive beamforming can be performed without increasing the overall feedback overhead for the system.

In an exemplary embodiment of the method 500 the vector $v_1$ is reconstructed. Assuming only two codebooks are used and $\hat{v}_1$ and $\hat{v}_1$ have been successively obtained as the quantized vectors:

$$v_1 = (v_1^* \hat{v}_1) \hat{v}_1 + v_2'$$
$$= (v_1^* \hat{v}_1) \hat{v}_1 + |v_2'| v_2$$
$$= |v_2'| ((v_1^* \hat{v}_1)/|v_2'|) \hat{v}_1 + v_2)$$
$$= |v_2'| ((v_1^* \hat{v}_1)/|v_2'|) \hat{v}_1 + \Phi(\hat{v}_1)^{-1} v_2'')$$
$$= |v_2'| \left((v_1^* \hat{v}_1)/|v_2'|) \hat{v}_1 + \Phi(\hat{v}_1)^{-1} \begin{bmatrix} 0 \\ \tilde{v}_2 \end{bmatrix}\right)$$
$$\approx \sqrt{1 - |\hat{\alpha}|^2} \left(\frac{\hat{\alpha}}{\sqrt{1 - |\hat{\alpha}|^2}} \hat{v}_1 + \phi(\hat{v}_1)^{-1} \begin{bmatrix} 0 \\ \tilde{v}_2 \end{bmatrix}\right)$$

where all quantities in the final equation are known and $$|v_2'| = \sqrt{1 - |\hat{\alpha}|^2},$$

obtained via the beamforming vector $v_1$ being the unit norm (e.g., $|v_1|=1$).

Figure 6:
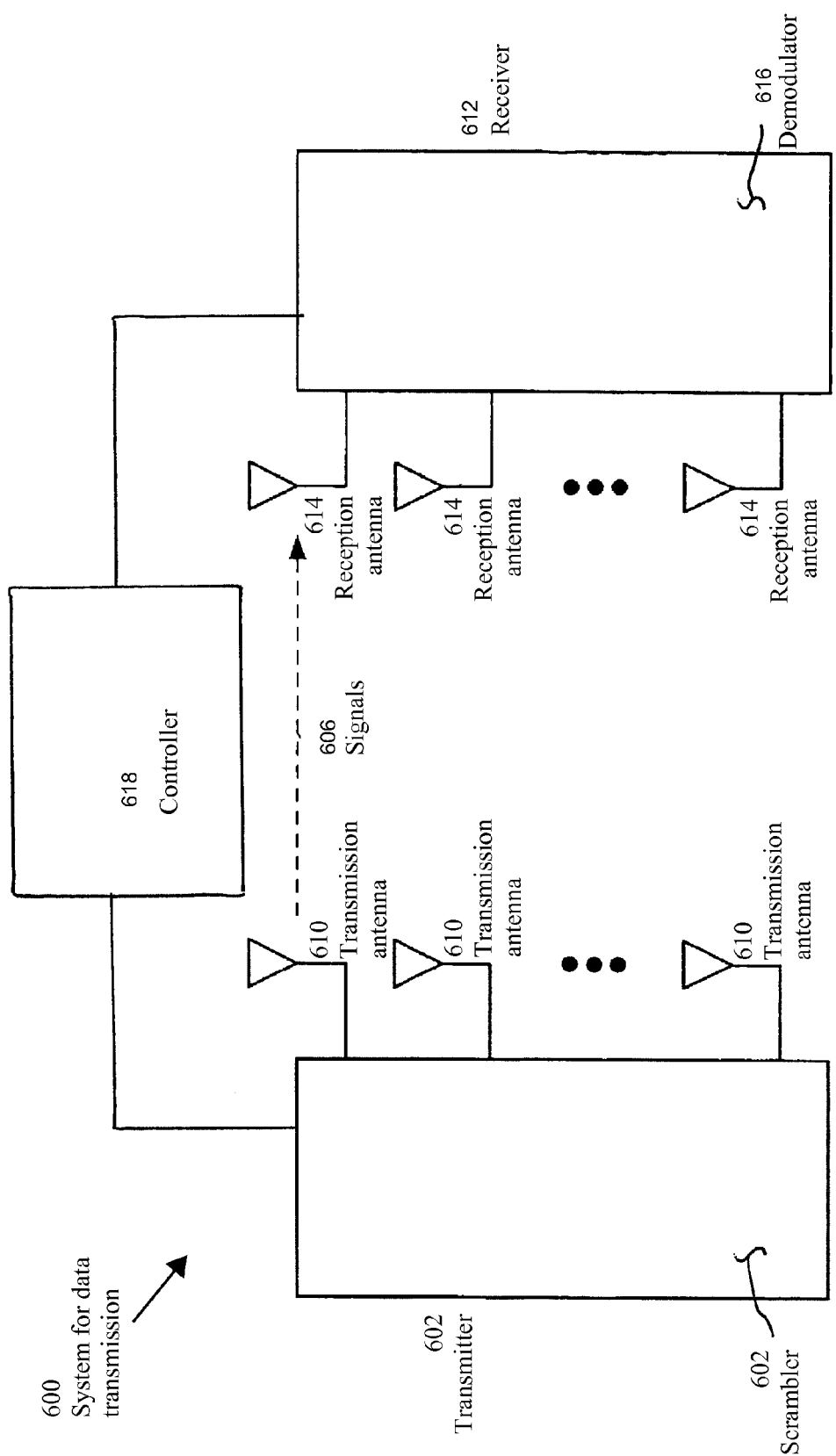
FIG. 6 depicts a system 600 for data transmission in accordance with some embodiments of the invention.

FIG. 6 depicts a system 600 for data transmission in accordance with an embodiment of the invention. The system 600 comprises a transmitter 602, which may contain and/or be in communication with (e.g., electrical, wireless, etc.) a scrambler 604. The transmitter 602 may be adapted to transmit signals (e.g., wireless communication signals) 606 via transmission antennas 610 or any other suitable transmission method (e.g., via wireline transfer, etc.). The system 600 may further comprise a receiver 612 having reception antennas 614, either of which may be adapted to receive signals 606 from the transmitter 602 and/or the transmission antennas 608). The receiver 612 may also comprise a demodulator 616. The system 600 may also have a controller 618 which may be in communication with the transmitter 602, the scrambler 604, the antennas 608 and/or 614, the receiver 612, the demodulator 616, and/or any other device in the system 600.

Transmitters 602, receivers 612, and other system components of the system 600 are well known in the art. It is understood that any appropriate combination of these components may be used to implement the invention as described herein. For example, the method steps of methods 300, 400, and 500 may be employed on, by, or at any combination of the controller 618, transmitter 602, the scrambler 604, the antennas 608 and/or 614, the receiver 612, the demodulator 616, and/or any other device in the system 600.

Transmitter 602 may be capable of transmitting multiple streams and/or over multiple parallel channels (e.g., signals 606 and/or over antennas 608 and/or 614). Similarly, receiver 612 may be capable of receiving signals 606. Demodulator 616 may be a LMMSE demodulator, a MMSE-SIC demodulator, a QR-MLD demodulator, or any other appropriate demodulator adapted to perform the functions as described herein with particular attention to the method 300.

In some embodiments, the controller 618 may be or may include any components or devices which are typically used by, or used in connection with, a computer or computer system. Although not explicitly pictured in FIG. 6, the controller 618 may include one or more central processing units, read only memory (ROM) devices and/or a random access memory (RAM) devices. The controller 618 may also include input devices such as a keyboard and/or a mouse or other pointing device, and output devices such as a printer or other device via which data and/or information may be obtained, and/or a display device such as a monitor for displaying information to a user or operator. The controller 618 may also include a transmitter and/or a receiver such as a LAN adapter or communications port for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program (e.g., controller software) may be read into a memory of the controller 618 from another medium, such as from a ROM device to a RAM device or from a LAN adapter to a RAM device. Execution of sequences of the instructions in the program may cause the controller 618 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller which may be adapted to execute the software program, and thereby operate in accordance with the present invention, and particularly in accordance with the methods described in detail below. However, it would be understood by one of ordinary skill in the art that the invention as described herein can be implemented in many different ways using a wide range of programming techniques as well as general purpose hardware sub-systems or dedicated controllers.

The program may be stored in a compressed, uncompiled and/or encrypted format. The program furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

As indicated herein, the controller 618 may generate, receive, store and/or use for computation databases including data related to transmission, scrambling, beamforming, and/or precoding. As will be understood by those skilled in the art, the schematic illustrations and accompanying descriptions of the structures and relationships presented herein are merely exemplary arrangements. Any number of other arrangements may be employed besides those suggested by the illustrations provided.

Figure 7:
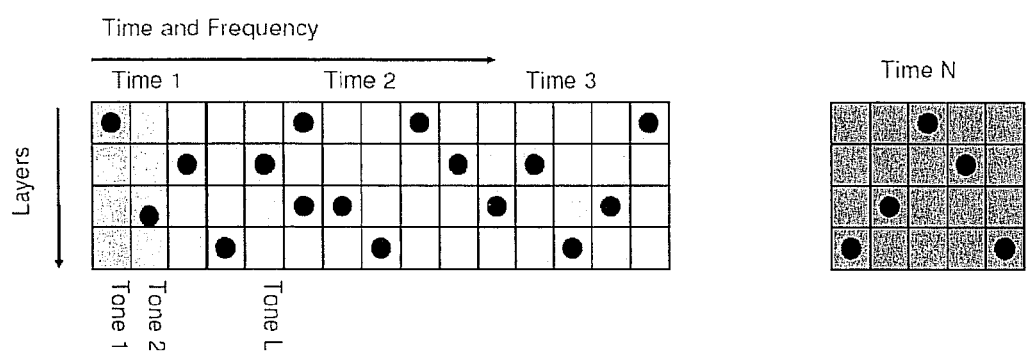
FIG. 7 depicts pseudo-random scrambling according to some embodiments of the present invention.

FIG. 7 depicts pseudo-random scrambling according to an embodiment of the present invention. In order to avoid capacity loss and achieve better rates for rank k transmission, SCW transmission may be used by encoding over all k layers or MCW may be used by encoding one stream per each layer and performing SIC decoding. SCW requires only one CQI feedback, but MCW requires multiple CQI feedbacks for all the streams. Also, SCW needs a high throughput decoder (e.g., a single stream of 100 MBPS to be decoded at anticipated peak rate of E-UTRA for 2×2 scenario), whereas the peak rate of each stream at MCW is less (e.g., substantially half −50 MPBS).

The CQI feedback requirement of multiple streams can be reduced by layer permutation. However, the use of MMSE-SIC for downlink is not preferred as it imposes much higher computational burden for the UE decoding operation and increased decoding delay.

Accordingly, the schemes with LMMSE or QR-MLD demodulators for which there are no extra decoding delay are preferred. In order to reduce the throughput requirement for the decoding of each stream and benefit from MCW operation but not increase the CQI reporting requirement, pseudo-random scrambling of each transmission stream into all layers may be employed (e.g., by scrambler 604 and/or controller 618). As a result, only one CQI will be reported that may be used by a Node B (e.g., receiver 612, reception antennas 614, and/or demodulator 616) to choose the rate for the encoding of all the streams. Such pseudo-random scrambling of the streams into the layers symmetrizes the system. In combination with LMMSE or QR-MLD decoding, the performance loss is negligible. The pseudo-random number generator (e.g., pseudo-random scrambler 604) that is used for such layering is chosen in static way and is known to all UEs and receiver 612 in advance. An example of such scrambling is depicted in FIG. 7.

The pseudo-random scrambling reduces the CQI reporting requirement for the MCW so that, with the same feedback requirement, MCW performs as well as SCW with a much lower decoder throughput requirement. This is as a result of dividing the throughput between the streams. However, if multiple CQI reporting is available, SCW scheme can also benefit by using different rates and/or power control over each layer (although only one streams is encoded over multiple layers) to improve the performance.

The foregoing description discloses only particular embodiments of the invention; modifications of the above disclosed methods and apparatus which fall within the scope of the invention will be readily apparent to those of ordinary skill in the art. For instance, it will be understood that the invention may be employed in MIMO systems and for lower and/or higher complexity precoding operations. Accordingly, while the present invention has been disclosed in connection with specific embodiments thereof, it should be understood that other embodiments may fall within the spirit and scope of the invention, as defined by the following claims.

What is claimed is:

1. A method of transmission implemented in a mobile terminal, comprising:
   generating precoding information in order for a remote transmitter to select a precoding matrix based on a codebook which has entries in the following form $$A(v^1, v^2, v^3, \ldots) = \left[v^1, HH(v^1 - e_1^M)\begin{bmatrix}0\\v^2\end{bmatrix}\right],$$

$$HH(v^1 - e_1^M)\begin{bmatrix}0\\HH(v^2 - e_1^{M-1})\begin{bmatrix}0\\v^3\end{bmatrix}\end{bmatrix}, \ldots$$

where the remote transmitter has M antennas, $e_1^N = [1, 0, \ldots, 0]^T \in C^N$, $C^N$ being N-dimensional complex space, $v^a$ denotes a column vector, and $HH(v^k - e_1^l)$ is a rotation matrix that transforms vector $v^k$ to the unit vector $e_1^l$;

and providing the precoding information to the remote transmitter.

2. The method of claim 1, wherein $$HH(w) = \begin{cases} I - 2\frac{ww^H}{\|w\|^2} & \text{if } w \neq 0 \\ I & \text{if } w = 0 \end{cases}$$

and is the house-holder transformation.

3. The method of claim 1, wherein the codebook entries are generated by selecting each vector $v^a$ from $V^a$ such that $$V^1 = \{v_i^1 \in C^M\}_{i=1}^{N_1}, V^2 = \{v_i^2 \in C^{M-1}\}_{i=1}^{N_2}, \ldots, V^{M-1} = \{v_i^{M-1} \in C^2\}_{i=1}^{N_{M-1}}.$$

4. The method of claim 1, wherein the precoding matrix is formed by picking one or more columns from the matrix $A(v^1, v^2, v^3, \ldots)$.

5. The method of claim 1, wherein a transmission rank is determined by the remote transmitter.

6. The method of claim 1, wherein a transmission rank is determined by the mobile terminal.

7. The method of claim 1, wherein the precoding information includes at least one of a rank, a channel quality index (CQI), and a precoding matrix index.

* * * * *